United States Patent [19]

Robertson

[11] 4,074,278

[45] Feb. 14, 1978

[54] COMPENSATION CIRCUIT FOR CHANNEL TO CHANNEL CROSSTALK

[75] Inventor: John A. Robertson, Chillicothe, Ohio

[73] Assignee: The Mead Corporation, Dayton, Ohio

[21] Appl. No.: 753,614

[22] Filed: Dec. 22, 1976

[51] Int. Cl.$^2$ .............................................. G01D 15/18

[52] U.S. Cl. ........................................................ 346/75

[58] Field of Search .......................................... 346/75

[56] References Cited

U.S. PATENT DOCUMENTS

| | | | |
|---|---|---|---|
| 3,604,980 | 9/1971 | Robertson | 346/75 X |
| 3,618,858 | 11/1971 | Culp | 346/75 X |
| 3,828,354 | 8/1974 | Hilton | 346/75 X |

*Primary Examiner*—Joseph W. Hartary

*Attorney, Agent, or Firm*—Biebel, French & Nauman

[57] ABSTRACT

A circuit, for applying a potential to a charge electrode in a multiple jet ink jet printer to compensate for the cross talk charging effect of adjacent electrodes on the jet filament, includes a means for applying a catch potential or a print potential to the electrode. Means are provided for altering the print potential when one of two adjacent electrodes is supplied with a catch potential and means are provided for altering the print potential when both of the adjacent electrodes are supplied with a catch potential. The print potential is reduced by an amount sufficient to reduce the cross talk field from adjacent electrodes in the region of the jet to the same potential level as the jet filament. A transistor current source applies a large current to the charge electrode during catch operations such that the stray capacitance associated with the electrode is rapidly charged and the electrode is brought to the catch potential rapidly.

7 Claims, 4 Drawing Figures

COMPENSATION CIRCUIT FOR CHANNEL TO CHANNEL CROSSTALK

BACKGROUND OF THE INVENTION

The present invention relates to ink jet printers and, more particularly, to circuitry for compensation of cross talk between adjacent charging electrodes in a printing system having multiple jets.

Ink jet printers have been developed in which a plurality of jets of ink drops are projected toward a moving print web. Drops in each of the jets are selectively charged. An electric field is provided in the path of the jets such that the charged drops are displaced laterally and directed toward a catching device. The uncharged drops are unaffected by the field and pass through, striking the print web. Typical prior art devices of this type are shown in U.S. Pat. No. 3,373,437, issued Mar. 12, 1968, to Sweet et al. and in U.S. Pat. No. 3,604,980, issued Sept. 14, 1971, to Robertson. The lateral accelerating force applied to the charged drops in such a system is proportional to the magnitude of the applied field and to the magnitude of the charge impressed upon the drops.

Although some ink jet printers print with charged drops, printing with uncharged drops offers several advantages. When printing with uncharged drops, the print trajectory of the drops is straight. It is therefore not difficult to determine the point of impact of a drop on the web. Additionally, if printing were done with charged drops, the print positions on the web could be a function of both the deflection field and the charges on the drops. Slight fluctuation in the charges induced on the drops would, therefore, result in deterioration of the image produced.

In systems in which printing is accomplished with uncharged drops, it is important that the print drops do not receive a slight charge inadvertently. One source of inadvertent charging is the drops which have been previously formed in the stream. Assuming the previous drop in a stream carries a charge, the subsequent uncharged drop will be formed in sufficient proximity to the charged drop that a slight charge of opposite polarity may be induced. Such drop-to-drop interference has been recognized as a significant problem and has been treated in several patents, such as U.S. Pat. No. 3,828,354, issued Aug. 6, 1974 to Hilton; U.S. Pat. No. 3,512,173, issued May 12, 1970, to Damouth; U.S Pat. No. 3,827,057, issued July 30, 1974, to Bischoff et al.; U.S. Pat. No. 3,789,422, issued Jan. 29, 1974, to Haskell et al.; U.S. Pat. No. 3,833,910, issued Sept. 3, 1974, to Chen; and, U.S. Pat. No. 3,631,511, issued Dec. 28, 1971, to Keur.

In U.S. Pat. No. 3,656,171, issued Apr. 11, 1972, to Robertson, the problem of cross talk between adjacent jets was also recognized. Typically, the drops in an individual jet are selectively charged by a charge electrode which is positioned adjacent the point at which the drops are formed. When the electrode is charged, an opposite charge is induced in the drop as it is being formed and this charge remains on the drop.

In a system in which the jets are positioned relatively close together to increase the system resolution a charge may be induced in a drop by a charging electrode associated with an adjacent jet. The effect of a charge so induced upon a charged drop, which is to be caught, is merely to alter its deflected trajectory slightly; the catching arrangement is such, however, that such a drop will still be caught. A print drop which is inadvertently charged by an adjacent charge electrode will be slightly deflected into a trajectory which will significantly affect the printing resolution of the system, however. While the Robertson U.S. Pat. No. 3,631,511 recognizes the problem of cross talk, the nature of the device disclosed therein is such that the effect of such cross talk is minimized and no compensation is needed. Where an externally generated deflection field is used for deflection, however, the cross talk effect will be more substantial and it is desirable to be able to compensate for such cross talk.

In U.S. Pat. No. 3,604,980, issued Sept. 14, 1971, to Robertson, inter-jet or inter-channel cross talk was also recognized as presenting a problem, with the suggested solution being an increase in shielding between charging electrodes. As the distance between jets is reduced, however, shielding becomes less feasible. A need exists, therefore, for a circuit arrangement which will minimize the effect of cross talk from adjacent charging electrodes.

SUMMARY OF THE INVENTION

A circuit for applying a potential to a charged electrode in an ink jet printer having multiple jets compensates for the charging effect of adjacent electrodes. Means are provided for applying a catch potential or a print potential to the electrode for catch or print operations. Means are provided for altering the print potential applied to the electrode when one of two adjacent electrodes is supplied with a catch potential. Means are also provided for altering the print potential applied to the electrode when both of the adjacent electrodes are supplied with a catch potential, such that the charging effect of adjacent electrodes is compensated.

Accordingly, it is an object of the present invention to provide circuitry which determines when adverse cross talk will exist betwen adjacent electrodes and alters the potential applied to the electrodes in order to compensate therefor; to provide such a circuit in which data signals representing the operative states of adjacent jets are applied to a digital logic circuit which determines the necessary potential to be applied to the electrode; and to provide such a circuit which alters the print potential applied to the electrode, thereby providing compensation.

Other objects and advantages of the invention will be apparent from the following description, the accompanying drawings and the appended claims.

DETAILED DESCRIPTION OF THE PREFERRED EMBODIMENT

Figure 1:
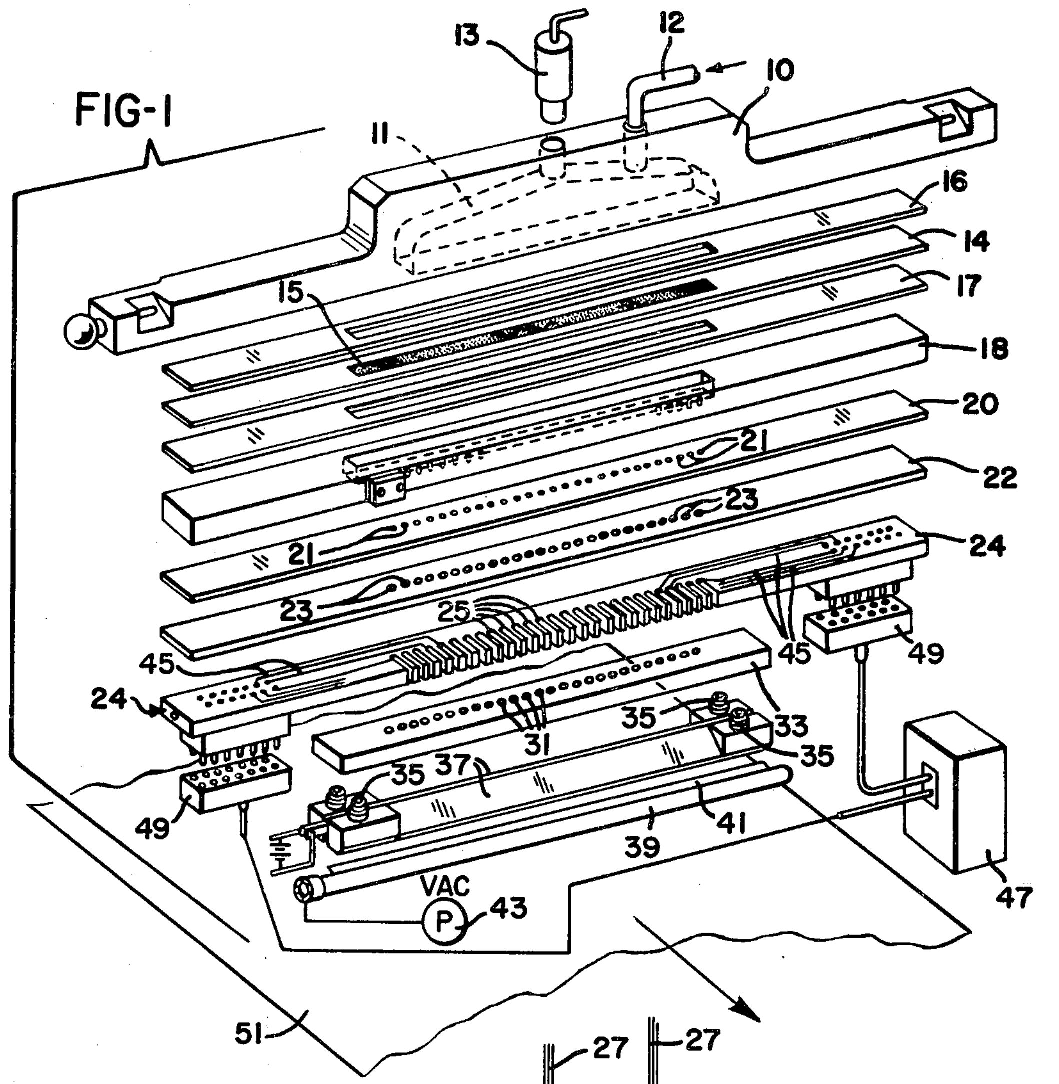
FIG. 1 is an exploded perspective view of an ink jet printer of the type which may be used with the present invention.

As seen in FIG. 1 of the drawings, an ink jet printing system will include a laminated printing head comprising a manifold 10 having a chamber 11 therein supplied with ink through a conduit 12 and provided with a vibrator 13 vibrating at a preselected, uniform frequency. A filter plate 14 is positioned beneath the manifold 10 and is provided with a central portion 15 having a series of very fine perforations therethrough to filter the ink as it leaves the manifold 10. Gaskets 16 and 17 are positioned on opposite sides of the filter plate 13 and an inlet plate 18 is laminated to the lower surface of the gasket 17.

Figure 2:
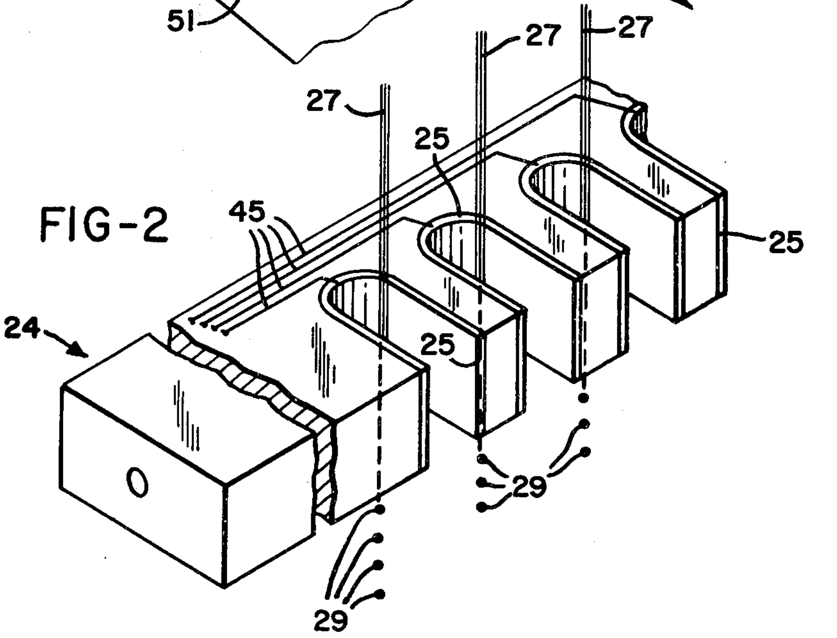
FIG. 2 is an enlarged perspective view of a portion of the charge bar.

Positioned beneath the inlet plate 18 is an orifice plate 20 having a series of uniformly spaced orifices 21 extending therethrough, while a spacer plate 22 is mounted beneath the orifice plate 20 to position a charge bar 24 the proper distance from the orifice plate 20. Filaments of conductive ink fluid will flow through orifices 21 and, as a result of the vibration of plate 20 by vibration 13, will tend to break up into a series of drops of relatively uniform size and spacing. The charge bar includes a plurality of charge electrodes 25 which are positioned to be adjacent the ends of the filaments of conductive ink fluid 27 which emerge through orifices 21 (FIG. 2).

If one of electrodes 25 is raised to an elevated potential with respect to its associated filament 27, it will attract to the end of that filament a like charge of opposite polarity. As the end of the filament breaks off, forming a drop 29, a portion of the induced charge will be carried by the drop.

Drops 29 will then descend downwardly through openings 31 in clamp 33. Clamp 33 has positioned beneath it, by means of pins 35, a pair of electrodes 37 for establishing an electrostatic deflection field. Clamp plate 33 will also be provided with a pair of brackets, not shown, attached to its lower surface and supporting a catcher mechanism 39, which has a blade 41 projecting from a slot formed in one side of the catcher beneath the opening between the two electrodes 37. The interior of the catcher 39 is hollow and is connected to a vacuum pump 43.

Leads 45 on charge bar 24 are connected to electrodes 25 and permit controller 47 to apply, selectively, charge inducing potentials to various ones of the electrodes 25. Leads 45 may be applied to the surface of bar 24 by printed circuit techniques and are connected to control 47 by plugs 49. Various ones of drops 29 which are formed without being charged will pass between the deflection electrodes 37 and will strike moving print web 51, forming the desired print image. The charged drops will, however, be deflected and caught by catcher 41 which will, in turn, be emptied by vacuum pump 43.

A significant cross talk problem may exist between the electrodes 25 when a first electrode is at the same potential as its associated conductive ink filament 27 (thus inducing no charge in the filament), while one of the adjacent electrodes is raised to a charge inducing potential. The charge inducing potential on the adjacent electrode may also tend to induce a slight charge on the ink filament associated with the first electrode. This will of course result in a slight deflection of the drop as it passes between electrodes 37 and a corresponding print position error.

In general, it may be said that if a drop which is to be caught normally has a charge $Q_0$ the cross talk charge induced from a single electrode raised to a catch potential on a drop which is intended to be uncharged in an adjacent jet will be $KQ_0$, where K is a number less than one. If both electrodes adjacent a jet are raised to a catch potential, the cross talk charge induced on a drop will be $2KQ_0$. Jets further removed will also induce slight cross talk charges but these may generally be ignored as negligible.

One way of reducing the cross talk between electrodes, as discussed previously, is by providing shielding between adjacent electrodes to reduce the charge inducing field generated by adjacent electrodes. If the electrodes are placed close together, however, it may not be feasible to provide adequate shielding.

The electrode arrangement of FIG. 2 will, of course, inherently permit greater cross talk than the charge ring type of electrode used in many prior art devices, for example U.S. Pat. No. 3,586,907, issued June 22, 1971, to Beam et al. Since a charge ring effectively surrounds the ink filament at the point of drop formation, the end of the filament will be somewhat shielded by the charge ring itself. Even this type of electrode arrangement will experience cross talk problems if the spacing between adjacent jets is sufficiently small. Additionaly, charge ring electrode arrangements are somewhat difficult to manufacture and this difficulty increases with a decrease in electrode size and inter-electrode spacing.

The approach taken for cross talk compensation in the present invention, however, is to neutralize the charge inducing field from remote electrodes by applying selectively to the associated electrode a potential of opposite polarity which is sufficient in magnitude to counteract the cross talk effect. In a system in which printing is accomplished with uncharged drops, it will be appreciated that this compensation need only be provided for print drops. The cross talk effect on charged drops which are to be caught can be neglected providing that drops having a charge slightly less than $Q_0$ will still be caught.

Assuming the printing operation is normally controlled by switching the electrodes between $V_{charge}$ and 0 volts (both taken with respect to the potential of the ink filament), the potential which should be applied to electrode "N" for compensation is given as follows:

| $ELECTRODE_{N+1}$ | $ELECTRODE_N$ | $ELECTRODE_{N-1}$ |
|---|---|---|
| 0 | $-k'V_{charge}$ | $+V_{charge}$ |
| $+V_{charge}$ | $-k'V_{charge}$ | 0 |
| $+V_{charge}$ | $-2k'V_{charge}$ | $+V_{charge}$ |

where $k'$ is a constant less than one, which is dependent upon the amount of cross talk in the printer being compensated.

Figure 3:
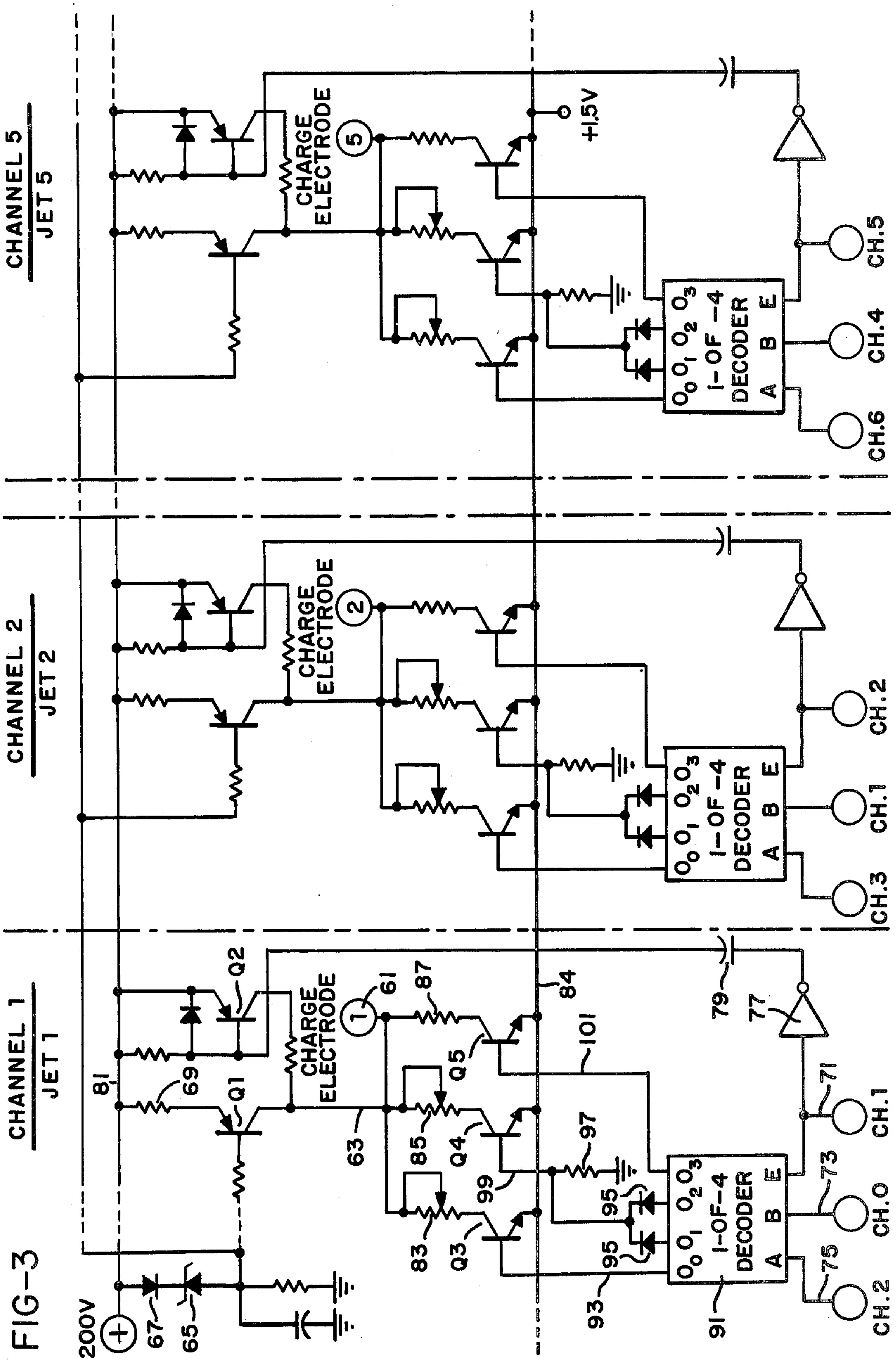
FIG. 3 is a schematic representation of a portion of the cross talk compensation circuit of the present invention.

Reference is now made to FIG. 3 in which a cross talk compensation circuit embodying the present invention is illustrated. Compensation circuits for three ink jet channels are shown but it will be appreciated that an additional circuit will be provided for each jet. The compensation circuit of the present invention operates exclusively with positive potentials; it will be appreciated, therefore, that the potential of the ink reservoir and, therefore, each ink jet filament, will be raised somewhat with respect to actual ground so that potentials, negative with respect to the reservoir, may be provided for compensation. This is strictly a matter of design choice, however, and it should be understood that compensation circuits could be provided which operate only with negative potentials (in which case the reservoir would be raised to a negative potential) or with both positive and negative potentials (in which case the reservoir might be grounded).

The potential level which is maintained on the reservoir will be determined by the amount of cross talk between the jets. The greater the cross talk, the higher the reservoir potential level so that when an electrode is effectively grounded, it will be sufficiently negative with respect to the jet filament to compensate for cross talk.

The cross talk compensation arrangement for each of the jet channels will be identical. Description will be made, therefore, with respect to the circuit of channel 1 with the understanding that the circuitry for the other channels operates in a similar fashion. Charge electrode 61 is connected by line 63 to transistor $Q_1$. Zener diode 65 and diode 67 are connected to the base of transistor $Q_1$ and maintain $Q_1$ in an ON state. Diode 67 compensates for the emitter to base drop of transistor $Q_1$ such that the zener 65 maintains a constant 6.8 volt drop across resistor 69 which may be on the order of 47k ohms. Thus the current source $Q_1$ will provide approximately 140 microamps on line 63. A first data input means 71 receives the data signal for jet channel 1, with a high or "1" input indicating a catch operation and a low or "0" input indicating a print operation. Data for the adjacent channels, channel 0 and channel 2, is received on lines 73 and 75, respectively, which constitute a second data input means.

When line 71 goes high, indicating a catch operation, cross talk compensation is not needed for the channel, as discussed previously. The high signal is supplied to inverter 77 which, via capacitor 79, provides a negative spike to transistor $Q_2$. This turns ON transistor $Q_2$ which, in parallel with transistor $Q_1$, charges the stray capacitance associated with electrode 61 and rapidly brings the potential on charge electrode 61 up to the high potential maintained on line 81. The potential on line 81 may be on the order of 200 volts. Transistor $Q_2$ and its associated circuitry provide means for applying a catch potential to the charge electrode 61 in a short period of time; even without transistor $Q_2$, however, if transistors $Q_3$, $Q_4$, and $Q_5$ were maintained OFF, the charge electrode 61 would eventually receive a potential equal to that on line 81 via transistor $Q_1$.

Assuming that the jet channel 1 is to be switched into a print operation, cross talk compensation may be needed. If no cross talk compensation is needed, a transistor $Q_3$ will be switched ON and the potential on charge ring 61 will be determined by the voltage drop across resistor 83. Resistor 83 will be set such that charge electrode 61 will be maintained at a potential equal to that of the ink reservoir. Line 84 is maintained nearly at ground potential (actually approximately 1.5 volts). Since there will be no potential difference between the filment of jet 1 and the charge electrode 61, no charge will be induced in the filament tip as a drop is formed and an uncharged drop will therefore result. Thus transistor $Q_3$ provides the means for applying the print potential to the charge electrode when no cross talk compensation is needed.

Should one of adjacent jet channels 0 and 2 be placed in a catch state, however, a means for altering the print potential will be provided by turning ON transistor $Q_4$ while transistors $Q_3$ and $Q_5$ remain OFF. The charge electrode 61 will therefore be held at a potential determined by the voltage drop across resistor 85. Resistor 85 will have a resistance which is less than resistor 83 such that the potential on charge electrode 61 will be sufficiently negative with respect to the jet filament to compensate for cross talk from the adjacent channel.

Finally, if both adjacent channels 0 and 2 are in a catch state, transistor $Q_5$, a further means for altering the print potential, will be switched ON while transistors $Q_3$ and $Q_4$ will be OFF. Resistor 87, typically approximately 2.2k ohms, will therefore determine the potential of the charge electrode. This resistor will be much less in value than resistors 83 and 85 and will have a relatively negligible voltage drop across it. Since line 89 is virtually grounded, the charge electrode 61 will be sufficiently negative with respect to the jet filament to compensate effectively for cross talk from both adjacent charge electrodes.

Digital logic means 91 receives on its A, B, and E inputs the data signals for channels 2, 0, and 1, respectively. Logic 91 determines which of the three transistor switching means $Q_3$–$Q_5$ should be switched ON to provide the necessary cross talk compensation. Output $O_0$ is provided on line 93 to the base of first transistor switch means $Q_3$. Outputs $O_1$ and $O_2$ are provided via an OR gate consisting of diodes 95 and resistor 97 to line 99 and the base of second transistor switch means $Q_4$. Output $O_3$ is provided, via line 101, to the base of third transistor switch means $Q_5$.

Figure 4:
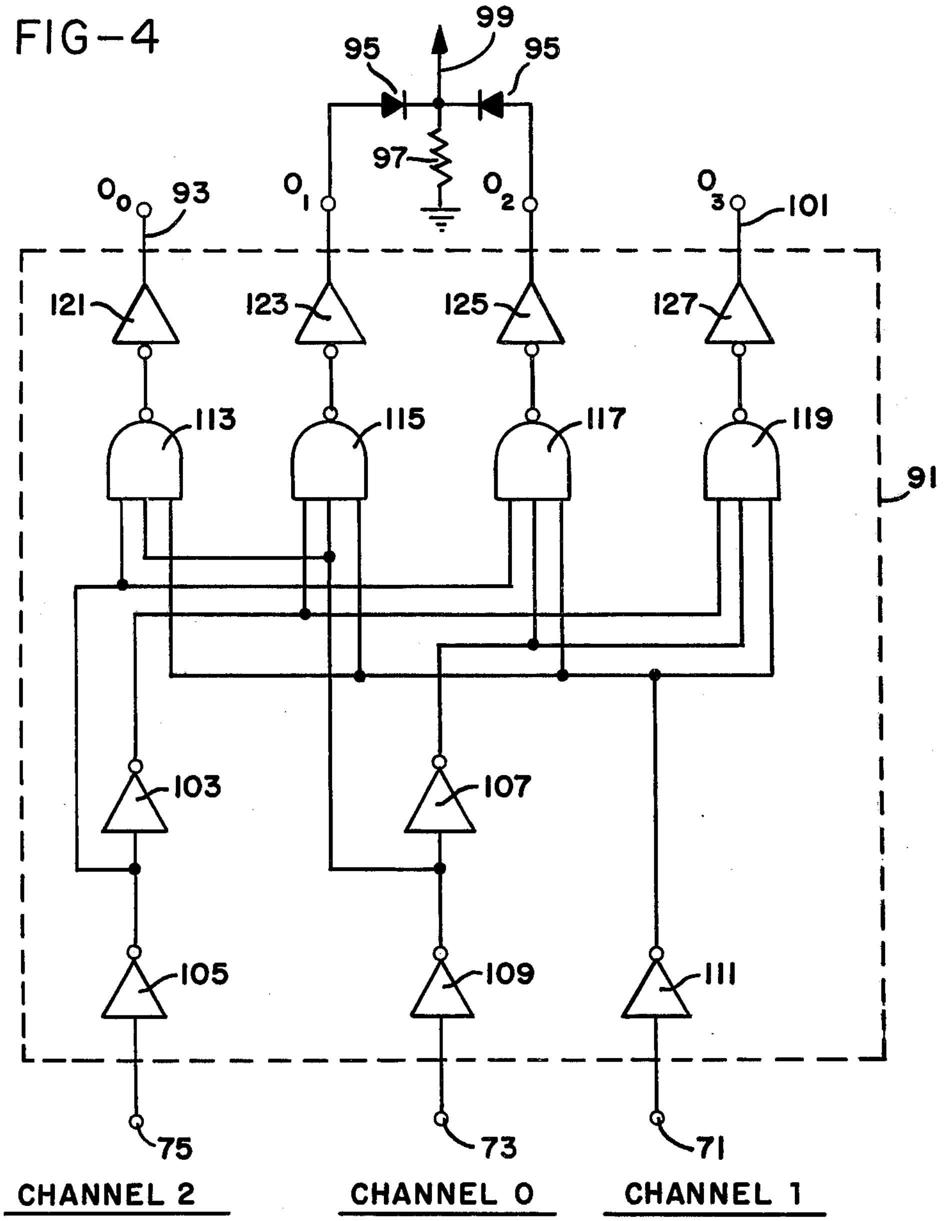
FIG. 4 is a schematic representation of a 1-of-4 decoder used in the compensation circuit of the present invention.

Logic 91 may typically be a Fairchild F4555 integrated circuit decoder available from Fairchild Camera and Instrument Corp., Mountain View, Calif. The schematic for such a decoder is shown in FIG. 4. Inverters 103, 105, 107, 109, and 111 receive the data signals and provide them to NAND gates 113, 115, 117, and 119, the outputs of which are inverted by inverters 121, 123, 125, and 127. A truth table showing the outputs of a decoder as a function of its inputs is as follows:

| | INPUT | | | OUTPUT | | | |
|---|---|---|---|---|---|---|---|
| | CH1 | CH2 | CH0 | $O_0$ | $O_1$ | $O_2$ | $O_3$ |
| CH.1 CATCH OPERATIONS | 1 | 0 | 0 | 0 | 0 | 0 | 0 |
| | 1 | 1 | 0 | 0 | 0 | 0 | 0 |
| | 1 | 0 | 1 | 0 | 0 | 0 | 0 |
| | 1 | 1 | 1 | 0 | 0 | 0 | 0 |
| CH.1 PRINT OPERATIONS | 0 | 0 | 0 | 1 | 0 | 0 | 0 |
| | 0 | 0 | 1 | 0 | 0 | 1 | 0 |
| | 0 | 1 | 0 | 0 | 1 | 0 | 0 |
| | 0 | 1 | 1 | 0 | 0 | 0 | 1 |

Note that all of the outputs from the decoder will be "0" when the jet channel 1 is performing a catch operation. Only when channel 1 is printing, will any of outputs $O_0$–$O_3$ be "1," thus providing the possibility of compensation.

The only cross talk compensation circuits which will not be identical to that of channel 1 are those associated with the jet channels which are at the extreme ends of the row of jets. It will be apparent that such a jet need be provided with circuitry to compensate for only one adjacent charge electrode. In such a case, a transistor corresponding to transistor $Q_5$ will not be needed and only one of outputs $O_1$ and $O_2$ will need to be supplied to the transistor corresponding to transistor $Q_4$.

It will be apparent that any number of channels may be compensated for cross talk with the present invention, with each channel having identical compensation circuitry operating in parallel. It should be understood that compensation could be provided with the pesent invention for cross talk from more remote charge electrodes if such cross talk were significant in an ink jet printer.

While the form of apparatus herein described constitutes a preferred embodiment of the invention, it is to be understood that the invention is not limited to this precise form of apparatus, and that changes may be made therein without departing from the scope of the invention.

What is claimed is:

1. A circuit for applying a potential to a charge electrode in an ink jet printer having multiple jets, to compensate for the charging effect of adjacent electrodes, comprising:

means for applying a catch potential or a print potential to the electrode for catch or print operations, respectively, means for altering the print potential applied to the electrode when one of two adjacent electrodes is supplied with a catch potential, and means for altering the print potential applied to the electrode when both of the adjacent electrodes are supplied with a catch potential, such that the charging effect of adjacent electrodes is compensated.

2. A circuit for applying a print potential, first and second adjusted print potentials, or a catch potential to a charge electrode associated with one jet in a multiple jet printer, comprising:

first data input means for receiving a data signal indicating a print or catch operation for the one jet, second data input means for receiving data signals indicating print or catch operations for the jets adjacent the one jet, first means, responsive to said first data input means, for applying a catch potential to the electrode, second means, responsive to said first and second data input means, for applying a print potential to said electrode, and third means, responsive to said first and second input means, for applying first or second adjusted print potentials to said electrode when one or more adjacent jets are being caught, respectively.

3. The circuit of claim 2 in which said first means comprises a transistor current source means for providing a large current to the charge electrode upon receipt by said first data input means of a data signal indicating a catch operation such that the charge electrode rapidly attains a catch potential.

4. A compensation circuit for adjusting the potential applied to a charge electrode associated with one ink jet in an ink jet printer to compensate for cross talk from adjacent electrodes, comprising:

data input means for receiving data signals for the one charge electrode and the adjacent electrodes, charge inducing potential means for applying a catch potential to the electrode, first switch means for reducing the voltage applied to the electrode to a potential equal to that of the associated ink jet, second switch means for reducing the potential on the electrode to a potential less than that of the jet by an amount sufficient to compensate for cross talk from one of said adjacent electrodes, third switch means for reducing the potential on said electrode to a potential which will compensate for cross talk from two adjacent electrodes, and digital logic means, responsive to said data input means, for switching said first, second, and third switch means such that the electrode is maintained at a potential which equalizes the cross talk fields from adjacent electrodes and prevents inadvertent charging of the drops in the jet.

5. The compensation circuit of claim 4 in which said charge inducing potential means for applying a catch potential to the electrode includes a transistor current source for applying a large current to the charge electrode such that stray capacitance associated with the electrode will be rapidly charged and the electrode will be brought to the catch potential rapidly.

6. A compensation circuit for use with an ink jet in an ink jet printer having multiple jets associated charge inducing electrodes to which print and catch potentials are applied, comprising:

means for applying a print potential or a catch potential to an electrode in correspondence to the operation desired, means for adjusting the potential applied to the electrode during print operations in a direction which will compensate for cross talk from adjacent electrodes by a predetermined amount when one of two adjacent jets is catching, and means for adjusting the potential applied to the electrode when both of the adjacent jets are catching by an amount twice said predetermined amount.

7. In an ink jet printer having a moving print web upon which an image is to be formed, means for generating a plurality of parallel jets of ink drops directed toward said moving web, said jets positioned in a row, a plurality of charge electrodes, each of said plurality of electrodes positioned adjacent the region of drop formation of a respective one of said jets, and means for generating a charge inducing potential for selectively charging said ink drops in each of said jets, the improvement comprising:

means, responsive to said means for generating a charge inducing potential, for selectively altering the potential of each of said charge electrodes when a charge inducing potential is not applied thereto such that the fields created in the region of jet drop formation by adjacent charge electrodes are reduced.

* * * * *